Aug. 21, 1956     E. L. MICHAELS     2,760,105

ELECTRICAL POTENTIAL INDICATOR SYSTEMS

Filed Sept. 18, 1950

INVENTOR.
EDWARD L. MICHAELS
BY Thomas A. Stansbury
ATTORNEY

United States Patent Office 2,760,105
Patented Aug. 21, 1956

2,760,105

ELECTRICAL POTENTIAL INDICATOR SYSTEMS

Edward L. Michaels, River Forest, Ill.

Application September 18, 1950, Serial No. 185,469

2 Claims. (Cl. 315—9)

The present invention relates to electrical potential indicator systems, and particularly to devices for displaying potentials as varying light intensities.

The electroencephalograph, which is commonly used for investigating brain potentials, amplifies and records these potentials on a moving strip of paper. Most of these machines employ six channels in order to indicate potential from six different points simultaneously. The use of more than six recorders not only increases the cost of the machine but also places a great strain on the interpretative ability of the operator. The present invention employs an extremely sensitive pick-up tube which will scan an area distribution of potentials and present them upon the screen of a cathode-ray display tube as a corresponding distribution of light intensities, the intensity of light at a given position on the screen being proportional to the magnitude of surface potential at the corresponding point on the area under investigation. The screen of the cathode-ray display tube then has the appearance of a map of the distribution of surface potentials present. Bright areas correspond to high potentials, while dark areas correspond to low potentials. In all previous potenial indicator systems a separate amplifier is required for each potential indicated.

It is an object of this invention, therefore, to provide a new and improved type of potential indicator system which will present a map or area display of potential distribution over a given area on the face of a cathode-ray tube.

It is a further object of this invention to provide a potential indicator system which will record a large number of potentials simultaneously.

It is an additional object of this invention to provide a sensitive potential indicator system which will record visually extremely small potentials.

A further object of this invention is to provide a potential indicator system which will record visually differences between extremely small potentials.

Still another object of this invention is to eliminate the necessity of providing a separate amplifier for each potential to be recorded.

Other and further objects and advantages of this invention will become apparent from the following description of the accompanying drawings, in which there is illustrated what are at present considered to be the preferred embodiments of this invention.

Figure 1:
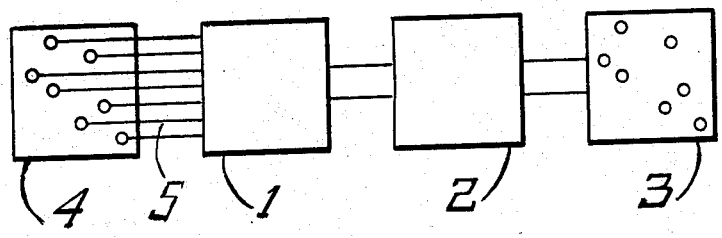
Figure 2:
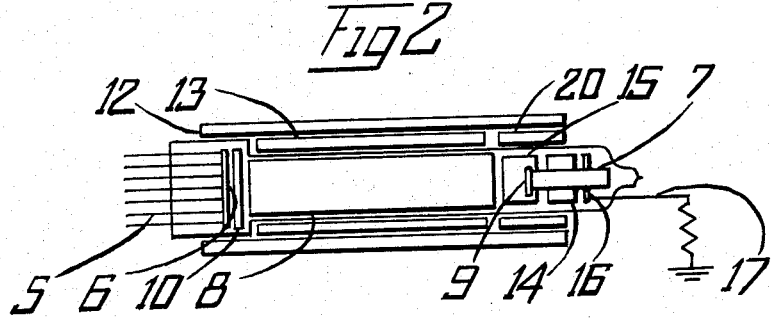
Figure 3:
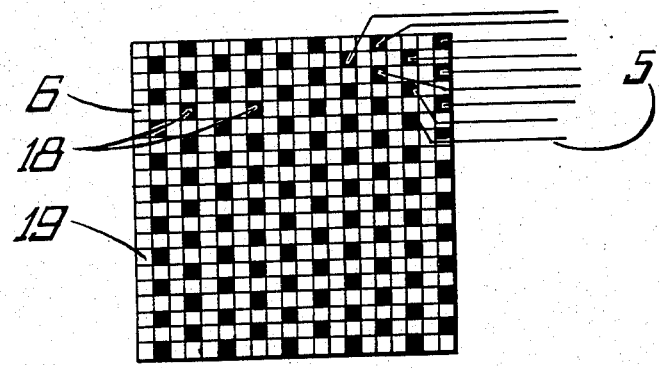

In the drawings, Fig. 1 is a schematic block diagram of a preferred form of electronic potential recording device; Fig. 2 is a schematic diagram of the pick-up tube shown in Fig. 1; Fig. 3 diagrammatically illustrates the construction of the target plate shown in Fig. 2.

For the purpose of illustrating the operation of this invention, it is assumed that the particular points of potential or area of distribution of potential to be investigated is the surface of the brain or scalp.

Reference to Fig. 1 will show that the mapping apparatus consists essentially of a sensitive pick-up tube 1, a high-gain amplifier 2, and a cathode-ray display tube 3. The amplifier and cathode-ray tube are of conventional design but the pick-up tube is new. Various points on the surface of the brain or scalp 4 are connected by means of pick-up leads 5 to a sensitive pick-up tube 1 which detects and amplifies the voltages appearing at said points on the scanned area 4. After further amplification by a high-gain amplifier 2, these voltages are used to intensity-modulate the electron beam of a conventional cathode-ray tube 3. The resulting pattern which appears on the screen of this cathode-ray tube is then a two-dimensional display of the distribution of potential on the surface of the brain 4. The brightness at a given position on the screen of the cathode-ray tube 3 is proportional to the magnitude of potential appearing at the corresponding point on the surface of the brain or scalp 4. Therefore an observer at the screen of the cathode-ray display tube 3 has the illusion that he is looking at the head of the patient and is seeing continuously the instantaneous distribution of potentials present on the surface of the brain 4.

Reference to Fig. 2 will show the construction of the pick-up tube 1 which can be conveniently divided into three parts, namely: the target section, the scanning section, and the multiplier section. The target section contains a target plate 6 which consists of a number of small, metallic target areas. Each target area is connected, through suitable glass seals, to corresponding pick-up leads 5 located external to the tube.

The scanning section of the pick-up tube consists of an electron gun 7 of conventional design, grids 8, 9, and 10 for focusing, accelerating, and decelerating the electron beam, and coils 12 and 13 external to the tube for focusing and deflecting the electron beam, respectively, in any conventional manner. An external magnet 20 is used to compensate for any mechanical misalignment of the gun structure. The target plate 6 is scanned by a low-velocity electron beam. As the beam electrons approach the target plate 6, they are decelerated to near zero velocity. If there is a positive charge on a target area as it is scanned, beam electrons are deposited on it at a rate dependent on its potential. The remaining beam electrons are reflected toward the electron gun 7. The reflected or returning beam is therefore intensity-modulated by the positive charge on the target area. The value of the current in the return beam is inversely proportional to the amount of charge on the portion of the target plate being scanned. The current variation in the return beam is such that maximum current corresponds to zero or negative charge, while minimum current corresponds to maximum positive charge on the target plate 6.

The multiplier section consists of several stages of an electrostatically focused electron multiplier which utilizes the phenomenon of secondary emission to amplify the signals formed by the returning beam electrons. Returning beam electrons are directed to the multiplier 14 by means of a multiplier focus grid 15. After amplification by the multiplier 14, the signal electrons are collected by the anode 16 which is connected to a load resistor 17 external to the tube.

Signals appearing across the load resistor 17 of the pick-up tube 1 are amplified further by a high-gain amplifier 2 of conventional design. The amplified output signals from the amplifier 2 are then applied to the control grid of a cathode-ray display tube 3. Thus the electron beam of the display tube 3 is intensity-modulated by the output signal of the pick-up tube 1. Since the electron beams in both the pick-up tube 1 and display tube 3 are deflected in synchronism, the resulting pattern of varying degrees of light intensity on the screen of the display tube 3 corresponds to the charge pattern appearing on the array of target areas in the pick-up tube 1.

Reference to Fig. 3 will show the matrix type of arrangement of the individual target areas 18 upon the target plate 6. Although the target areas 18 on the target plate 6 are essentially insulated from one another, there is a light coat of high-resistivity material 19 over the entire target plate 6 in order to render the spaces between target areas 18 slightly conducting for the purpose of preventing an accumulation of charge between target areas 18 and thus avoiding spurious signals. Each target area 18 is connected to a corresponding pick-up lead 5 external to the pick-up tube 1. The target areas 18 are scanned in any conventional manner by the electron beam. Since the screen of the cathode-ray display tube 3 is scanned in a similar manner, voltages appearing at the target areas 18 are reproduced in time and location as corresponding light intensities on the screen of the display tube 3.

I claim:

1. An electrical potential indicator system comprising a plurality of metallic targets each connected to a desired point of potential, said metallic targets being mounted on a glass plate and the area between said targets being covered by a high resistivity material, an electron gun whose electron beam scans said targets, an electrostatically focused electron multiplier for amplifying the return electron beam from said targets, a decelerating grid for decelerating the said electron beam to zero velocity, a load resistor connected to the collecting plate of said electron multiplier, a cathode-ray tube whose electron beam is controlled by the signal voltage appearing across said load resistor, and sweep circuits for scanning the said electron beams of the said electron gun and said cathode-ray tube synchronously.

2. The method of visually determining the relative magnitudes of electrical brain potentials at a plurality of desired points by attaching said points to metallic targets, which are scanned by the electron beam from an electron gun, said metallic targets being mounted on a glass plate and the area between said targets being covered by a high resistivity material, decelerating said electron beam to zero velocity upon reaching said targets, amplifying the deflected electron beam from the said targets, using such amplified voltage signal to control the intensity of the electron beam of a cathode-ray tube, and synchronously sweeping the said electron beams of the said electron gun and the said cathode-ray tube.

References Cited in the file of this patent

UNITED STATES PATENTS

| | | |
|---|---|---|
| 2,096,012 | Soller | Oct. 19, 1937 |
| 2,327,222 | Sell | Aug. 17, 1943 |
| 2,433,941 | Weimer | Jan. 6, 1948 |
| 2,501,637 | Snyder | Mar. 21, 1950 |
| 2,517,808 | Sziklai | Aug. 8, 1950 |
| 2,528,726 | Rines | Nov. 7, 1950 |
| 2,541,374 | Morton | Feb. 13, 1951 |
| 2,548,405 | Snyder | Apr. 10, 1951 |
| 2,563,395 | Carpentier | Aug. 7, 1951 |
| 2,696,522 | Rines | Dec. 7, 1954 |